Oct. 27, 1925.

W. R. SNYDER

TILE MAKING MACHINE

Filed April 4, 1923

INVENTOR
William R. Snyder
By W. W. Williamson
Atty

Oct. 27, 1925.  
W. R. SNYDER  
TILE MAKING MACHINE  
Filed April 4, 1923  
1,559,014  
7 Sheets-Sheet 6

INVENTOR  
William R. Snyder  
By W. W. Williamson  
Atty.

Oct. 27, 1925.
W. R. SNYDER
TILE MAKING MACHINE
Filed April 4, 1923
1,559,014
7 Sheets-Sheet 7
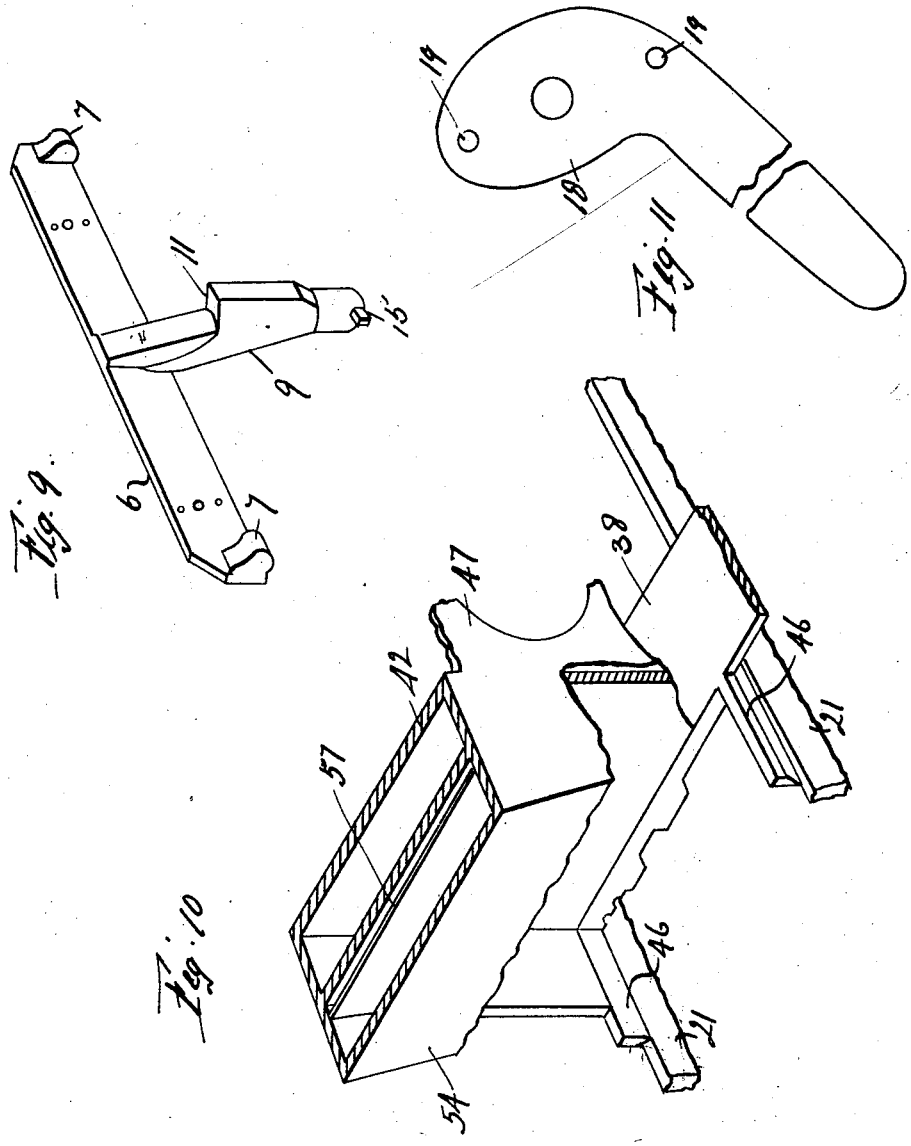
INVENTOR
William R. Snyder
By W. W. Williamson
Atty.

Patented Oct. 27, 1925.

1,559,014

UNITED STATES PATENT OFFICE.

WILLIAM R. SNYDER, OF PHILADELPHIA, PENNSYLVANIA.

TILE-MAKING MACHINE.

Application filed April 4, 1923. Serial No. 629,784.

*To all whom it may concern:*

Be it known that I, WILLIAM R. SNYDER, a citizen of the United States, residing at Philadelphia, in the county of Philadelphia and State of Pennsylvania, have invented new and useful Improvements in a Tile-Making Machine, of which the following is a specification.

My invention relates to new and useful improvements in a tile making machine, which is particularly adapted for use in making roofing tiles and has for its primary object to generally improve and simplify the structure of such devices.

Another object of the invention is to construct a device of this character which although manually operated will be semi-automatic in its movements.

Another object of the invention is to provide for holding a quantity of material and feeding the same to the pallet ahead of the slicker and to provide means for actuating said slicker to operate on extreme outer end of material and simultaneously closing the hopper or receptacle containing the tile material.

A further object of the invention is to provide means for applying coloring material to the slicked tile in any desired quantity.

A still further object of the invention is to so construct the machine that the parts will be interchangeable making it possible to substitute different parts for the manufacture of different shaped tiles.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 9, is a perspective view on a reduced scale of said side plate.

Fig. 10, is a fragmentary broken detail sectional view of the machine hopper and the slicker.

Fig. 11, is a face view of one of the eccentric operating levers.

Figure 6:
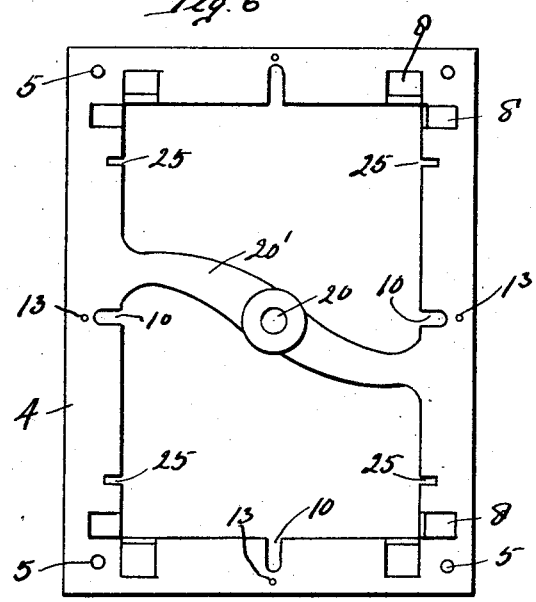
Fig. 6, is a plan view on a reduced scale of the frame.
Figure 8:
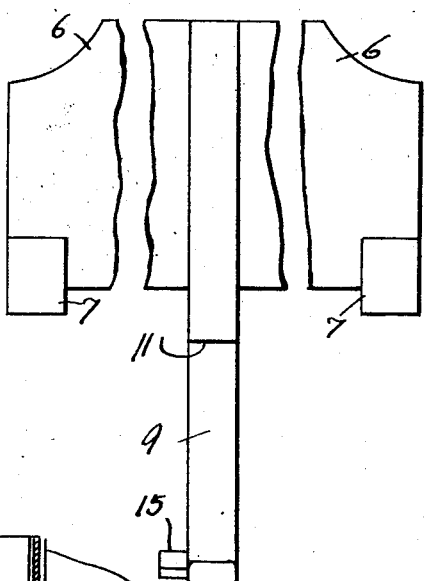
Fig. 8, is an enlarged broken outer face view of one of the side plates.

In carrying out my invention as here embodied, 2 and 3 represent the legs or standards of the machine to which are secured the ends of the frame 4, shown in Fig. 6, by means of bolts or their equivalent passing through holes 5 in the frame and screwed into the legs or standards. Around this frame are removably and adjustably set the side plates 6 (Figs. 8 and 9) said plates having fulcrum knuckles 7 for registration with the fulcrum sockets 8 in the top face of the frame 4. Centrally arranged of these plates are depending arms 9 which when the plates 6 are drawn into place will enter the slots 10 in the frame 4 and these depending arms having offset shoulders 11 by which the movement of the arms and therefore their respective plates are regulated by means of set screws 12 passing through the holes 13 in the frame adjacent the slots 10, said screws being held in their adjusted positions by lock nuts 14 or their equivalent. At the lower ends of the depending arms 9 are the lugs or projections 15 which hold the arms in engagement with the bars 16. These bars 16 have elliptical or elongated openings 17 through which the lower ends of the arms 9 with the lugs 15 pass when the plates 16 are in alignment with the bars since the longer diameter of the holes 17 lie longitudinally of the bars.

The inner ends of the bars 16 are pivoted to the fulcrum levers 18 by means of trunnions at their inner ends which register with the holes 19 in the levers 18 the latter being pivoted or journalled upon the peg 20 carried by the cross piece 20' of the frame 4.

By first setting the knuckles 7 of the plates 6 in the sockets 8 with said plates in a tilted position and then throwing the eccentric lever 18 in the proper direction the two oppositely disposed side plates which are connected with the same eccentric lever by means of their respective bars 16 will be simultaneously moved so that the legs 9 thereof are thrown outward until the shoulders 11 engage the set screws 12 which will have then moved the side plates to upright positions thus practically forming a box in which the pallet, to be later described, is housed. These plates 6 may be of various or any desirable shapes those at the sides preferably having a straight upper edge while those at the ends are shaped to correspond with the slicker which is adapted to pass over the end plates in its operations as will be later described.

To these plates 6 are secured the face plates 21 by means of suitable securing devices 22 such as bolts and nuts and these face plates may be adjusted relative to the plates 6 and held in their different adjusted positions by means of suitable set screws 23 which are threaded through the plates 6 and impinge against the inner faces of the face plates 21. If found desirable these face plates 21 may be shaped to correspond to the slicker in use, so that one set of plates 6 could be utilized while any number of face plates could be interchangeably fastened thereon.

At each end of the frame 4 is a demountable pallet support 24 which must be shaped to correspond to the particular pallet being used and these rest upon the upper face of the frame 4 with portions setting in the notches 25 to properly position them and prevent accidental displacement.

On these supports rests a pallet 26 and which is held in place laterally and endwise by means of the plates 6 and their respective face plates 21.

To the legs or standards 2 are fastened the adjustable guides 27 by means of bolts 28 or their equivalent which pass through the side portions of the legs or standards and through elongated holes or slots 29 in the guide the latter being held in its vertical adjustment by means of set screws 30 and in their lateral adjustments by means of set screws 31. These guides have guideways 32 in which run the guide shoes 33 of the slides 34, said slides supporting a shaft 35 at their rear ends and said shaft is revoluble by means of a crank handle 36 attached at one end.

Each of the slides 34 has a shelf or ledge 37 on which is sidably mounted the ends of the slicker 38, said slicker being adjustable for wear by means of set screws 39 and this slicker carries cleats 40 forming guideways which also act as attaching means in conjunction with the beads 41 for connecting the slicker to the material holding box 42 which is also journalled upon the shaft 35.

At each end of the slicker is a hanger 43 to which is pivoted in any suitable manner one end of a connecting rod 44 the other end of said rod being connected to a hanger 45 fixed to the shaft 35 so that when the crank handle 36 is moved the slicker will be reciprocated. When the slicker is to the rear of the box so that the lower end of the latter is is open the slots or spaces between the upper ends of the face plates and the lower edge of said box are closed by the slicker arms 46, as plainly shown in Fig. 10.

Figure 1:
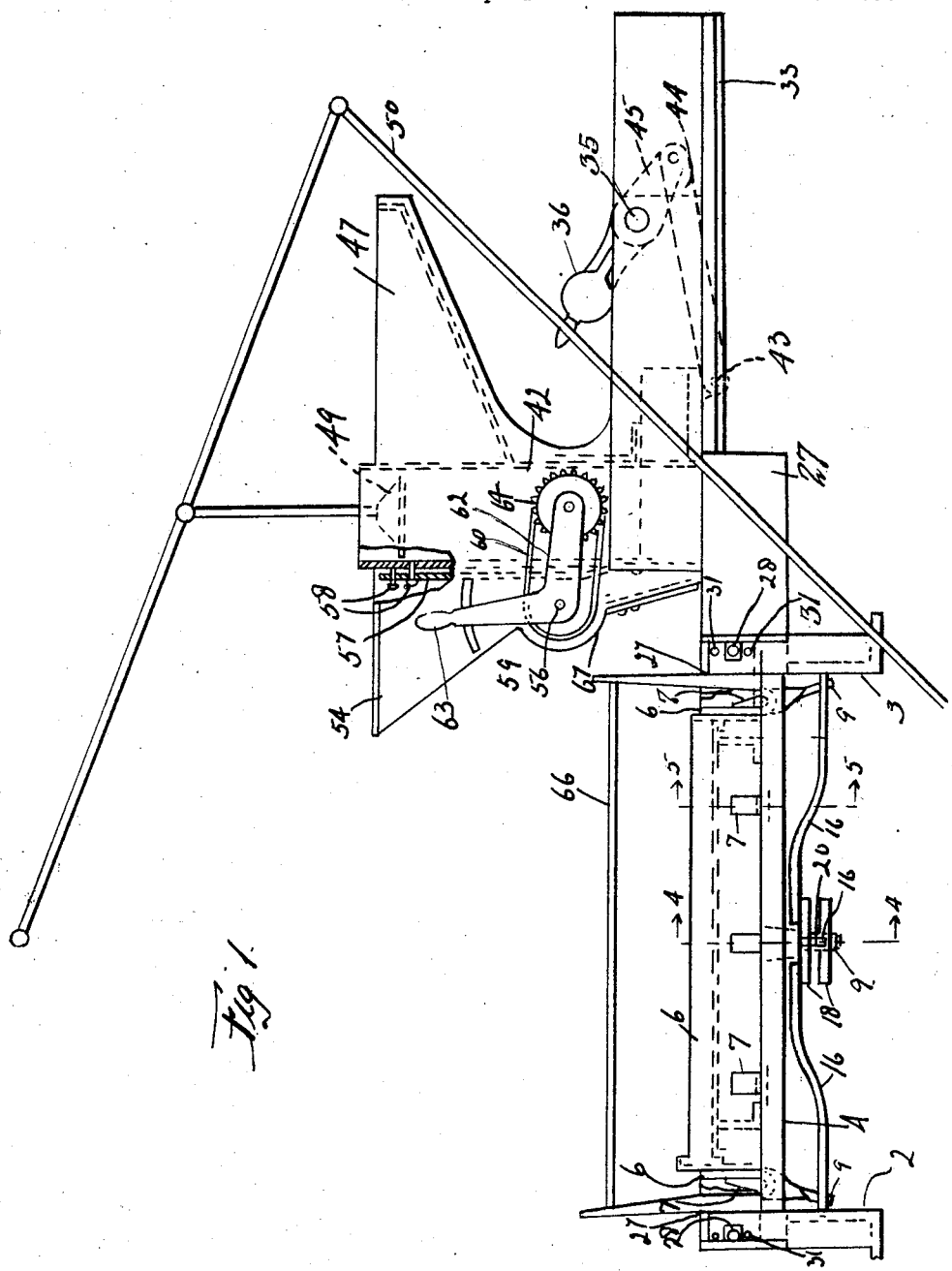
Fig. 1, is a side elevation of a machine embodying my improvements, portions thereof being broken away and shown in section to illustrate details of construction.
Figure 2:
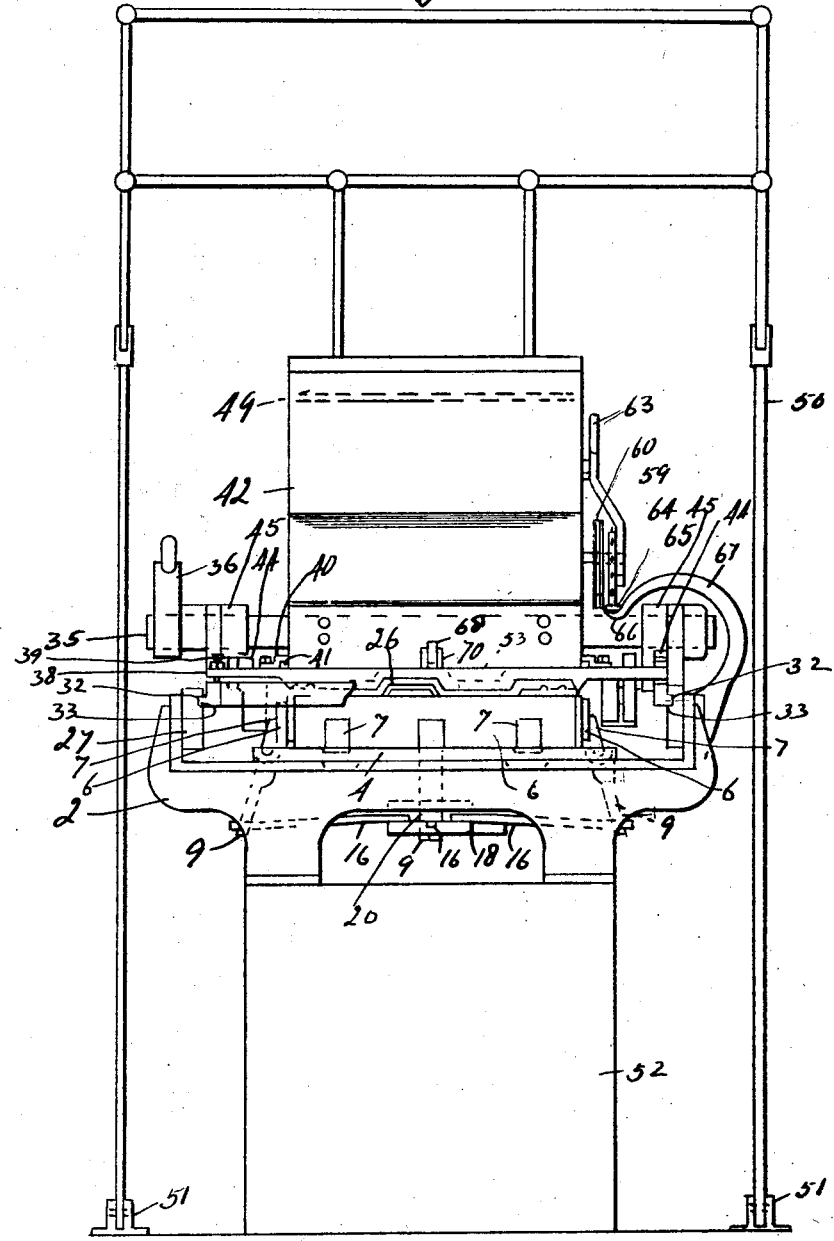
Fig. 2, is an end view thereof.
Figure 3:
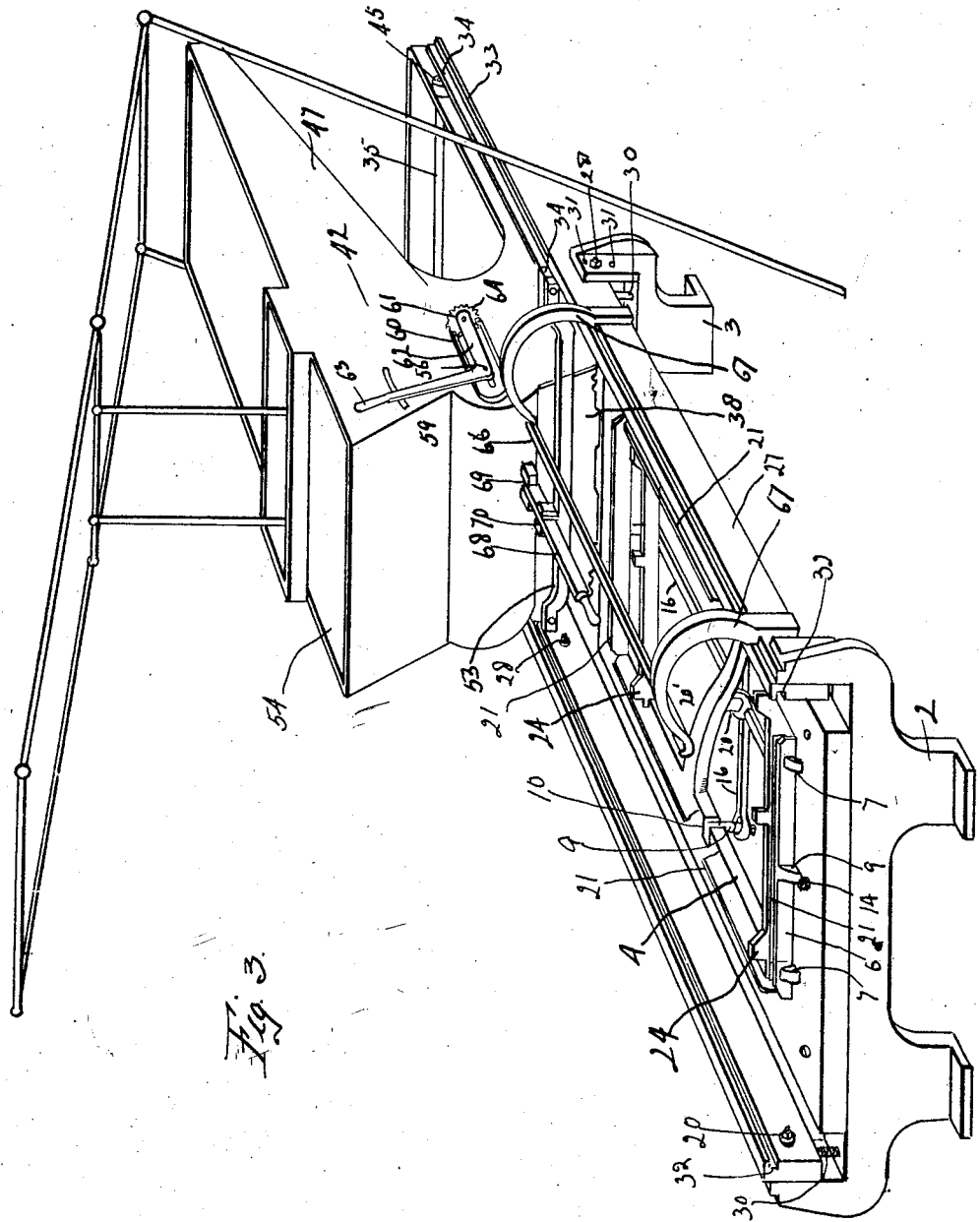
Fig. 3, is a perspective view of the machine with the pallet removed and portions broken away to illustrate the construction.
Figure 4:
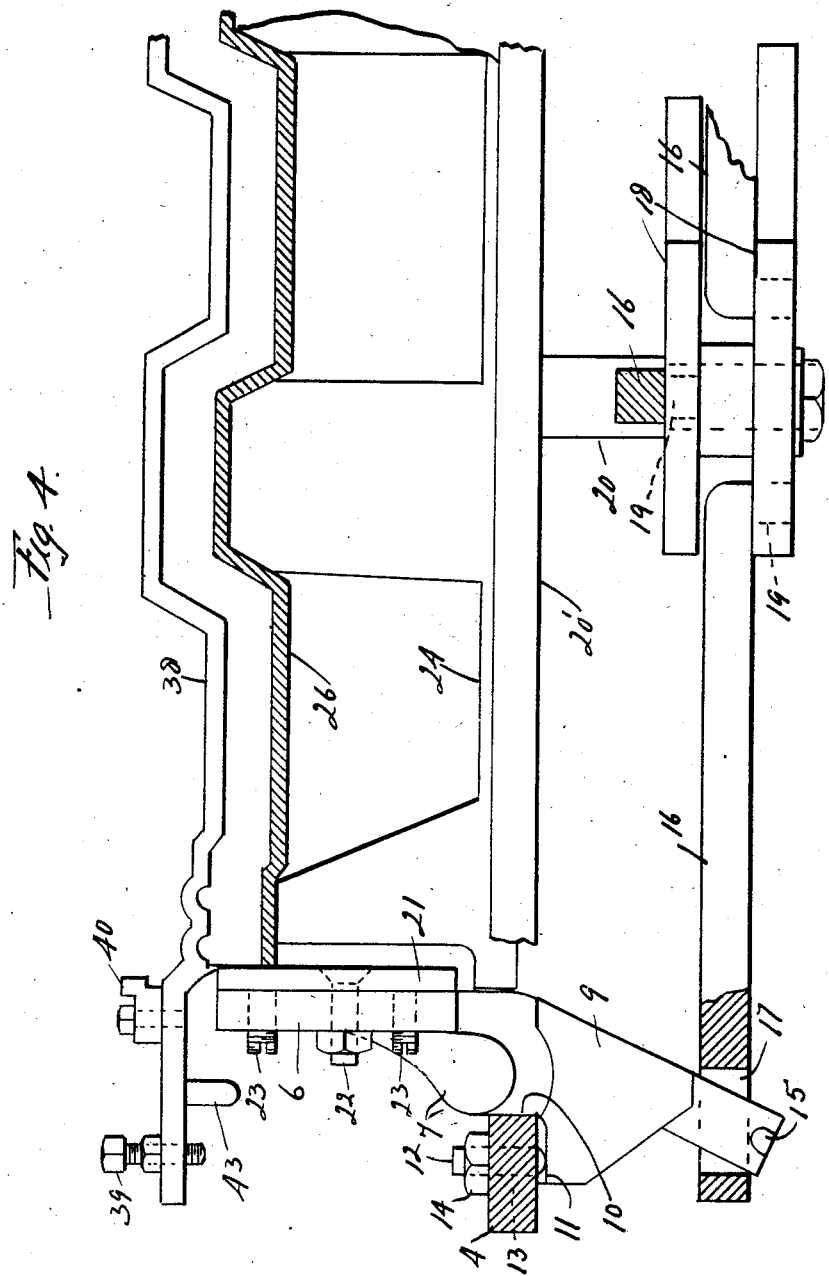
Fig. 4, is an enlarged fragmentary sectional elevation of the frame, pallet and its supporting elements or component parts and showing the relation of the slicker thereto taken on approximately the line 4—4 of Fig. 1.
Figure 7:
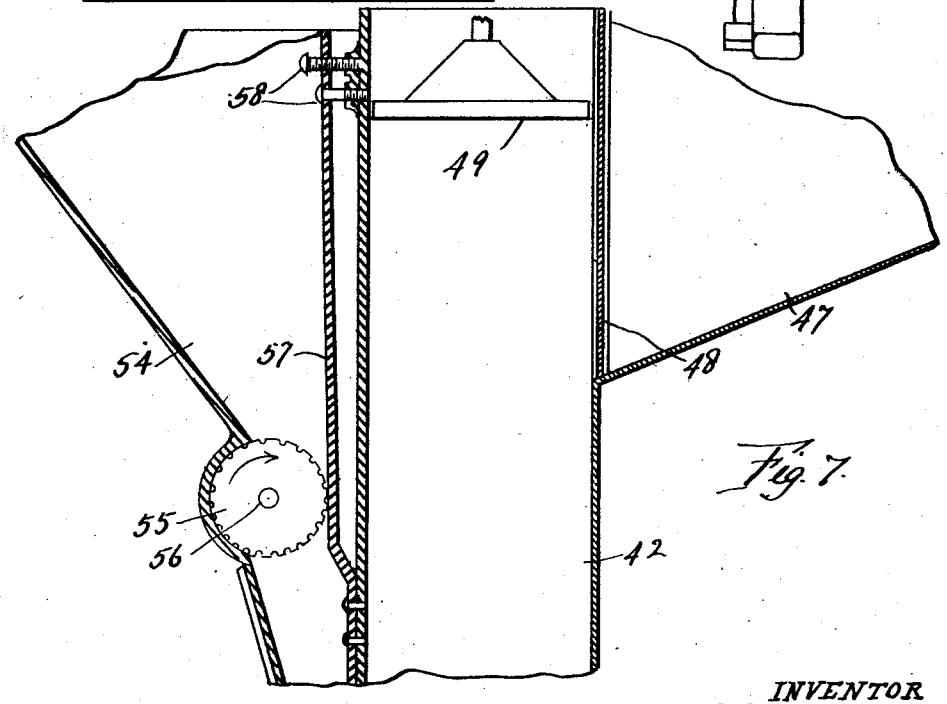
Fig. 7, is an enlarged fragmentary vertical sectional view through the machine hopper.

The material box 42 carries a hopper 47 by which the material for forming the tiles may be fed into the box and the doorway forming the communication between the hopper and box is normally closed by a door or slide 48, Fig. 7, which may be actuated from the outside in any suitable manner. In the box is a plunger 49 actuated by a toggle lever 50 or its equivalent, the fixed ends of which are secured to brackets 51 on the floor of a building or its equivalent, it being understood that the machine is supported on a bench as represented by the numeral 52 in Fig. 2, or its equivalent. This arrangement permits the plunger 48 to be forced downward by the operator during the time the box is being moved forward which latter movement is accomplished by the operator gripping the handle 53 secured to the slides 34.

The material hopper 47 is preferably arranged at the back of the box while at the front thereof is located a container 54 for coloring matter having a corrugated feed roll 55 therein and mounted on a shaft 56 journalled in the side of the container. The revolving of the feed roll in the direction of the arrow shown thereon in Fig. 7 will cause the coloring matter to be fed from the container and permitted to drop down on the unfinished tile as the box 42 is moved thereover. The amount of coloring matter to be fed by the roll may be regulated by the resilient regulating plate 57 having its lower end fixed within the container 54 below the feed roll while its upper end is adjustable by means of screws 58 which if threaded inward will increase the space between the regulating plate 57 and the feed roll thereby increasing the supply of coloring matter, whereas if said screws are backed outward the opposite action takes place and the supply will be decreased.

In order to revolve the feed roll 55 I mount a pulley 59 on one end of the shaft 56 and over this runs a belt 60 which runs over another pulley 61 mounted on a shaft at the outer free end of the supporting arm 62 which is movable about the same center as the shaft 56 and said supporting arm is actuated by a lever 63. Connected with the pulley 61 so as to revolve therewith is a sprocket wheel 64 adapted to engage the chain 65 held in the trough 66 which is supported by the brackets 67. This sprocket 64 will only engage the chain 65 when the lever 63 has been properly manipulated and the material box 42 moved forward a sufficient distance to bring the sprocket wheel 64 directly over the chain.

In order to raise the box and slicker slightly during one of the operations, I have shown a lever 68 pivoted as at 69 to the container for the coloring matter which with the box 42 forms a carriage, said lever also being pivoted intermediate its ends as at 70 to ears or their equivalent carried by the handle 53.

The operation of the device is as follows:—

The cement or other suitable material from which the tiles are to be forced is placed in the hopper 47 and then forced into the box 42 while the plunger 49 is raised and after a sufficient quantity of the material has been forced into the box the slide or door 48 is closed. Now by drawing the carriage which includes the box 42 and its component parts forward by gripping the handle 53 and simultaneously forcing the plunger 49 downward through the medium of the toggle lever 53 the material in the box 42 will be forced onto the pallet 26 supported by the members 24 mounted on the frame 4 and the material being forced onto the pallet will be spread out of shape by the slicker 38 following directly behind the lower open end of the box 42. As soon as the carriage has been drawn forward the entire distance of the pallet the crank handle 36 is actuated to rotate the shaft 35 and cause it to move the slicker forward a distance equal to the width of the open end of the box 42 thus shaping the last and relatively small part of the tile and at the same time closing the box 42 to prevent any more of the material dropping onto the pallet during the rearward movement of the carriage.

Figure 5:
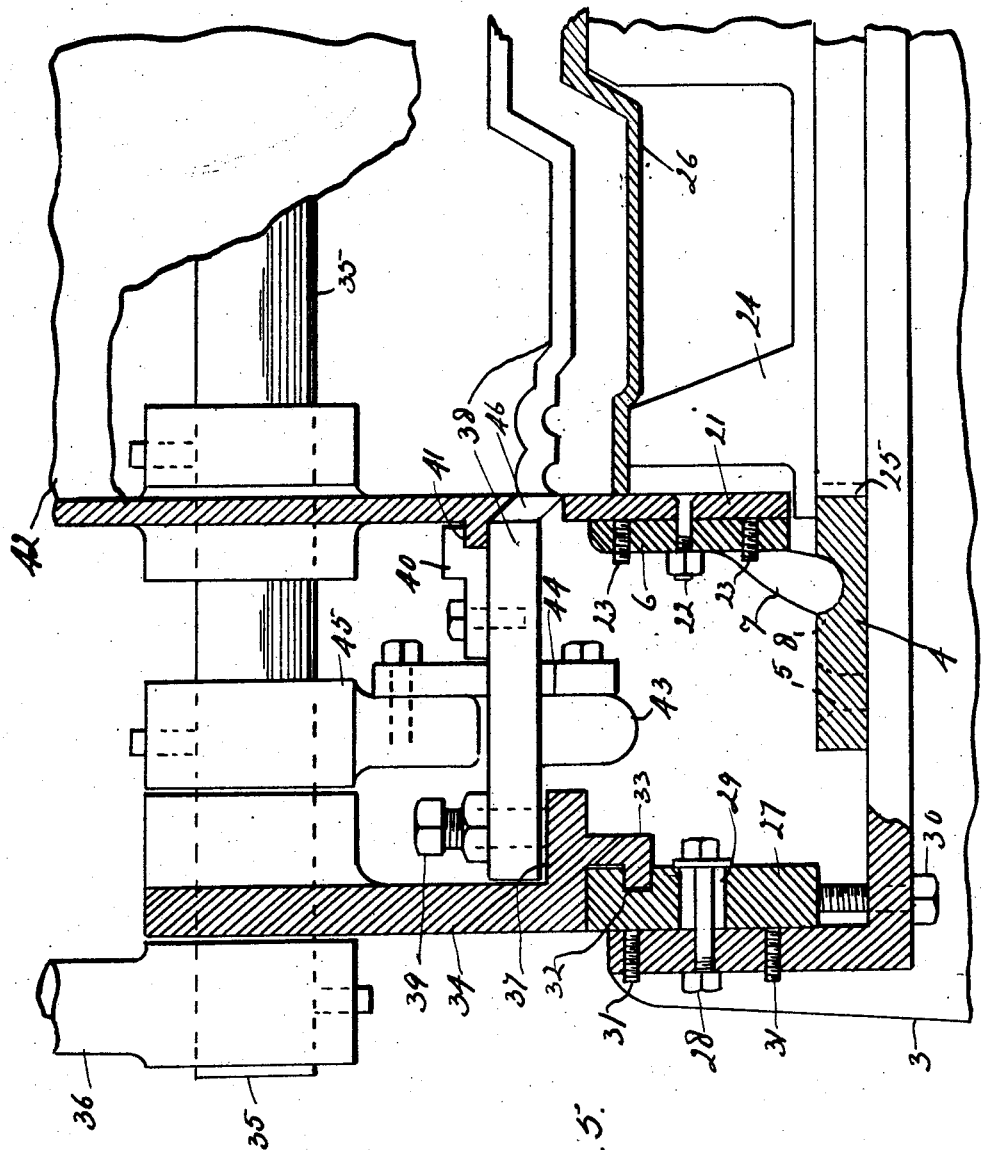
Fig. 5, is a similar view at approximately the line 5—5 of Fig. 1.

When ready to move the carriage backward the operating lever 63 is actuated to bring the sprocket wheel 64 into mesh with the chain 65 then during the backward movement of the carriage which slicks or smooths the face of the tile the coloring matter will be fed from the container 54 to the smooth slicked surface of the tile. Next the sprocket wheel 64 is raised so that the coloring matter will be no longer fed to the tile and the outer free end of the lever 68 is grasped and forced downward so as to raise the carriage which action, it will be seen by reference to Fig. 5, will lift the slicker through the medium of the beads 41 and the cleats 40 so as to disengage the slicker from the tile and while the carriage is in this condition it is again drawn forward and then the lever 68 released so that the slicker will rest upon a colored surface of the tile after which the carriage is again moved rearwardly so as to give the finishing slicking action. Preparatory to forming the next tile the crank handle 36 is moved to its normal position which will withdraw the slicker from beneath the box 42 to permit the outflow of material.

Of course I do not wish to be limited to the exact details of construction as herein shown as these may be varied within the limits of the appended claims without departing from the spirit of my invention.

Having thus fully described my invention, what I claim as new and useful is:—

1. In a device of the character stated, the combination of a frame having notches in its inner edges and recesses in its upper face, side plates having knuckles for registration with the recesses to removably and hingedly mount the side plates on the frame, arms depending from said plates, eccentric levers supported by the frame, and bars pivoted to the eccentric levers and detachably connected with the lower ends of the plate arms whereby said plates may be swung upon their knuckle joints.

2. In a device of the character stated, the combination of a frame having notches in its inner edges and recesses in its upper face, side plates having knuckles for registration with the recesses to removably and hingedly mount the side plates on the frame, arms depending from said plates, eccentric levers supported by the frame, bars pivoted to the eccentric levers and detachably connected with the lower ends of the plate arms whereby said plates may be swung upon their knuckle joints, each of said arms having an offset shoulder and set screws carried by the frame for coaction with said shoulders to regulate or limit the inward movement of the plates.

3. In a tile making machine, the combination of legs or standards, a frame fixed to said standards, pallet supporting means detachably mounted on said frame, a pallet removably seated on said supporting means, side plates removably and adjustably mounted on the frame, means also supported by the frame to force said plates toward the pallet, face plates adjustably secured to said side plates, a material holding box adapted to be moved back and forth over the pallet, a slicker movable with the box, and means for moving said slicker independent of the box.

4. In a tile making machine, the combination of legs or standards, a frame fixed to said standards, pallet supporting means detachably mounted on said frame, a pallet removably seated on said supporting means, side plates removably and adjustably mounted on the frame, means also supported by the frame to force said plates toward the pallet, face plates adjustably secured to said side plates, a carriage movable over the pallet, said carriage including a box adapted to hold material for making a tile, a manually operated plunger in said box for forcing the material therefrom, a hopper communicating with the box, means for closing the communication between the two, a slicker normally lying to the rear of the box and adapted to travel therewith, and means to actuate said slicker independent of the box for slicking that portion of a tile in the course of formation which is directly beneath the box and for temporarily closing the lower end of said box.

5. In a tile making machine, the combination of legs or standards, a frame fixed to said standards, pallet supporting means detachably mounted on said frame, a pallet removably seated on said supporting means, side plates removably and adjustably mounted on the frame, means also supported by the frame to force said plates toward the pallet, face plates adjustably secured to said side plates, a carriage movable over the pallet, said carriage including a box adapted to hold material for making a tile, a manually operated plunger in said box for forcing the material therefrom, a hopper communicating with the box, means for closing the communication between the two, a slicker normally lying to the rear of the box and adapted to travel therewith, means to actuate said slicker independent of the box for slicking that portion of a tile in the course of formation which is directly beneath the box and for temporarily closing the lower end of said box, a container for coloring material also forming a part of the carriage, means for feeding the material from the container, means for placing said feeding means in operative condition during the movement of the carriage in one direction, and means for lifting said carriage and slicker therewith in order to pass the latter over the tile in the course of manufacture without engaging it.

6. In a device of the character stated, the combination of standards, pallet supporting means connected with said standards, a pallet on said supporting means, guides adjustably connected to the standards, slides mounted on said guides, a slicker slidably mounted upon said slides and adapted to be moved across the pallet when the slides are actuated, a shaft journalled in said slides, means for rotating said shaft, means for transmitting motion from said shaft to the slicker whereby the latter may be moved along the slides relative thereto, and a carriage journalled on said shaft whereby said carriage may be manually tilted to move it away from the pallet, and means for connecting the carriage and slicker so that the latter may be moved with the carriage or independently thereof.

7. In a device of the character stated, a pallet, a carriage movable over said pallet and including a holder for material from which a tile is to be made, and a container for coloring material, a feed roll in the container, and means for regulating the amount of material to be fed by said roll, said means comprising a resilient plate having its lower end fixed at a point below the feed roll and projecting upward past said roll in proximity thereto, and means for moving said plate to different positions to vary the space between it and the feed roll.

In testimony whereof, I have hereunto affixed my signature.

WILLIAM R. SNYDER.